United States Patent

[11] 3,630,081

| [72] | Inventor | Kurt Nelson<br>Wappingers Falls, N.Y. |
|---|---|---|
| [21] | Appl. No. | 967 |
| [22] | Filed | Jan. 6, 1970 |
| [45] | Patented | Dec. 28, 1971 |
| [73] | Assignee | The De Laval Separator Company<br>Poughkeepsie, N.Y.<br>Continuation-in-part of application Ser. No. 707,230, Feb. 21, 1968, now Patent No. 3,499,422. This application Jan. 6, 1970, Ser. No. 967 |

[54] MILK METERING APPARATUS
23 Claims, 11 Drawing Figs.

[52] U.S. Cl............................................................. 73/219,
119/14.08, 119/14.17
[51] Int. Cl............................................................ G01f 3/28

[50] Field of Search............................................ 73/219;
119/14.08, 14.17

[56] References Cited
UNITED STATES PATENTS
2,998,722 9/1961 Jaquith........................ 73/219

*Primary Examiner*—Richard C. Queisser
*Assistant Examiner*—John P. Beauchamp
*Attorney*—Davis, Hoxie, Faithfull & Hapgood ABSTRACT: Milking apparatus includes a reciprocating milk metering tilt table which is coupled by a shaft and clutch assembly to fluidic digital sensors. In accordance with selected aspects of the present invention, fluidic logic is employed to control the tilt table motion; to supply a quantitative indication of the milk yielded by an animal during a milking cycle; and to signal completion of milking.

INVENTOR
Kurt Nelson

INVENTOR.
Kurt Nelson

INVENTOR.
Kurt Nelson

OR Gate 110

$C = A + B + A \cdot B = A + B$
$D = (A+B)' = A' \cdot B'$

AND Gate 120

$G = E \cdot F$
$H = (E \cdot F)' = E' + F'$

ONE-SHOT CCT. 140

INVENTOR
Kurt Nelson

BY
Davis, Hoxie, Faithfull & Hapgood
ATTORNEYS

MILK METERING APPARATUS

This application is a continuation-in-part of my copending application Ser. No. 707,230, filed Feb. 21, 1968, now U.S. Pat. No. 3,499,422.

This invention relates to milking apparatus and, more specifically, to a milk flow meter and digital fluidic logic apparatus attendant thereto.

Milking systems in common use comprise a plurality of milker units each having a set of vacuum-actuated teat cups, a vacuum pulsator for operating the teat cups via a milking claw, and a receiver into which milk from the teat cups is delivered. During milking, the milker units are connected to a common vacuum pipe line for placing the respective receivers under vacuum and for applying vacuum intermittently to the teat cups under control of the respective pulsators. In many systems, the milker units are also connected to a common milk pipe line or bulk tank, also placed under vacuum, for withdrawing milk from the respective receivers after recording the milk weight.

General practice in the use of such systems is for dairy personnel to transfer the teat cups of each milker unit from one cow to another until an entire herd has been milked. However, a major obstacle to efficient use of the system has been the difficulty in determining when the milking of each cow has been completed, as this determination usually requires inspections of each of the various units from time to time during each of its operations. Unless the teat cups of each unit are transferred quite promptly to another cow upon completion of a milking operation and emptying of the receiver, the time required to milk the herd is prolonged; and excessive delay in removing the teat cups from a fully milked cow may be injurious to her. Such prior art milking systems have therefore typically required a relatively great amount of human supervision and control.

In addition, it is desirable in automated and manual milking apparatus to employ a simple, reliable milk meter for developing an accurate measure of the milk produced by each animal. Milk production is a significant factor in many economic decisions regarding the animal, e.g., its food supply, number of desirable lactation cycles and the like.

It is an object of the present invention to provide improved milking apparatus.

More specifically, an object of the present invention is the provision of improved milk-metering apparatus, useful per se or in conjunction with automated milking equipment, for providing a real time quantized quantitative measure of milk given by a cow during milking.

Another object of the present invention is to provide an improved tilt table milk meter which operates reliably, without possible indeterminate equipoise conditions.

Yet another object of the present invention is the provision of a milk meter, with attendant binary combinatorial and sequential logic apparatus, for determining the quantity of milk given by an animal, and for automatically providing an output signal when milking has been completed.

These and other objects of the present invention are realized in specific, illustrative milk meter apparatus employing digital fluidic logic control. The milk meter employs a reciprocating tilt table tray, comprising two contiguous chambers, which is mounted at one end of a central shaft.

Mounted about the shaft are abutting clutch members, the driven clutch member being free to rotate relative to the shaft. The driving clutch member is inhibited from rotating relative to the shaft, but is mounted to slide axially along the shaft to selectively disengage the two clutch members. Two fluidic sensors are provided to yield an output signal when a predetermined torque, corresponding to a fixed weight of milk residing in an associated one of the tilt table tray chambers, is applied to the sensor via the tilt table and the engaged clutch members.

During a milking operation, milk is diverted by the tray configuration to one of the two chambers. After the critical amount of milk is accumulated, the sensor associated with that chamber is actuated and supplies an output signal. Pneumatic apparatus responds to the output signal by momentarily disengaging the clutch members, allowing the table to rotate thereby emptying the previous filled tray chamber for collection. This initiates filling of the alternate tray chamber to initiate a counter rotation of the tilt table tray after the requisite amount of milk has been gathered.

The tray continuously reciprocates in this manner, the pulses from the two sensors being counted to register the total quantity of milk given by the cow. Additional fluidic logic circuitry is provided to supply a signal when milking has been completed, determined when the rate at which milk is being supplied falls below a minimally acceptable threshold level.

A complete understanding of the present invention and of the above and other objects, features and advantages thereof may be gained from a consideration of the following detailed description of an illustrative embodiment thereof presented hereinbelow in conjunction with the accompanying drawing, in which:

FIG. 1 comprises a top view in partial cross section form of illustrative milk meter apparatus embodying the principles of the present invention;

Figure 6A:
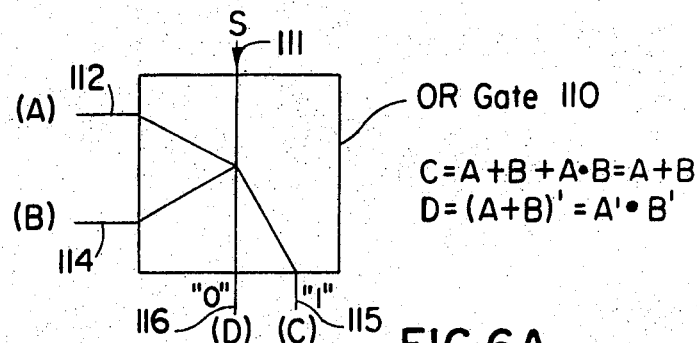
Figure 6B:
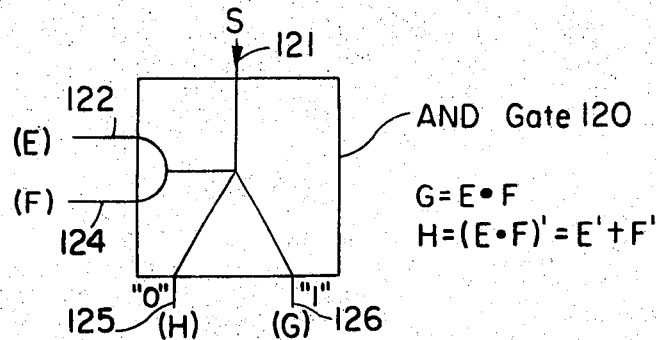
Figure 6C:
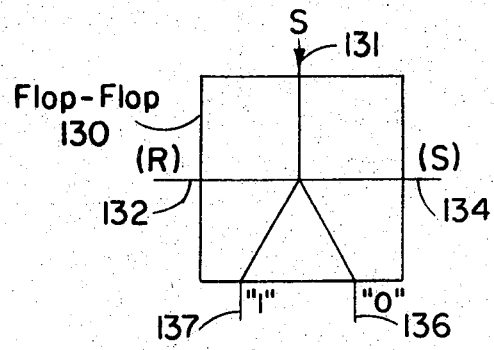
Figure 6D:
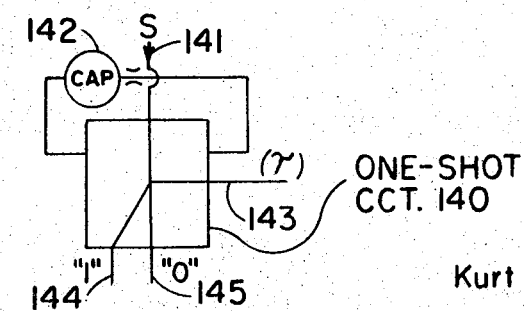
Figure 7:
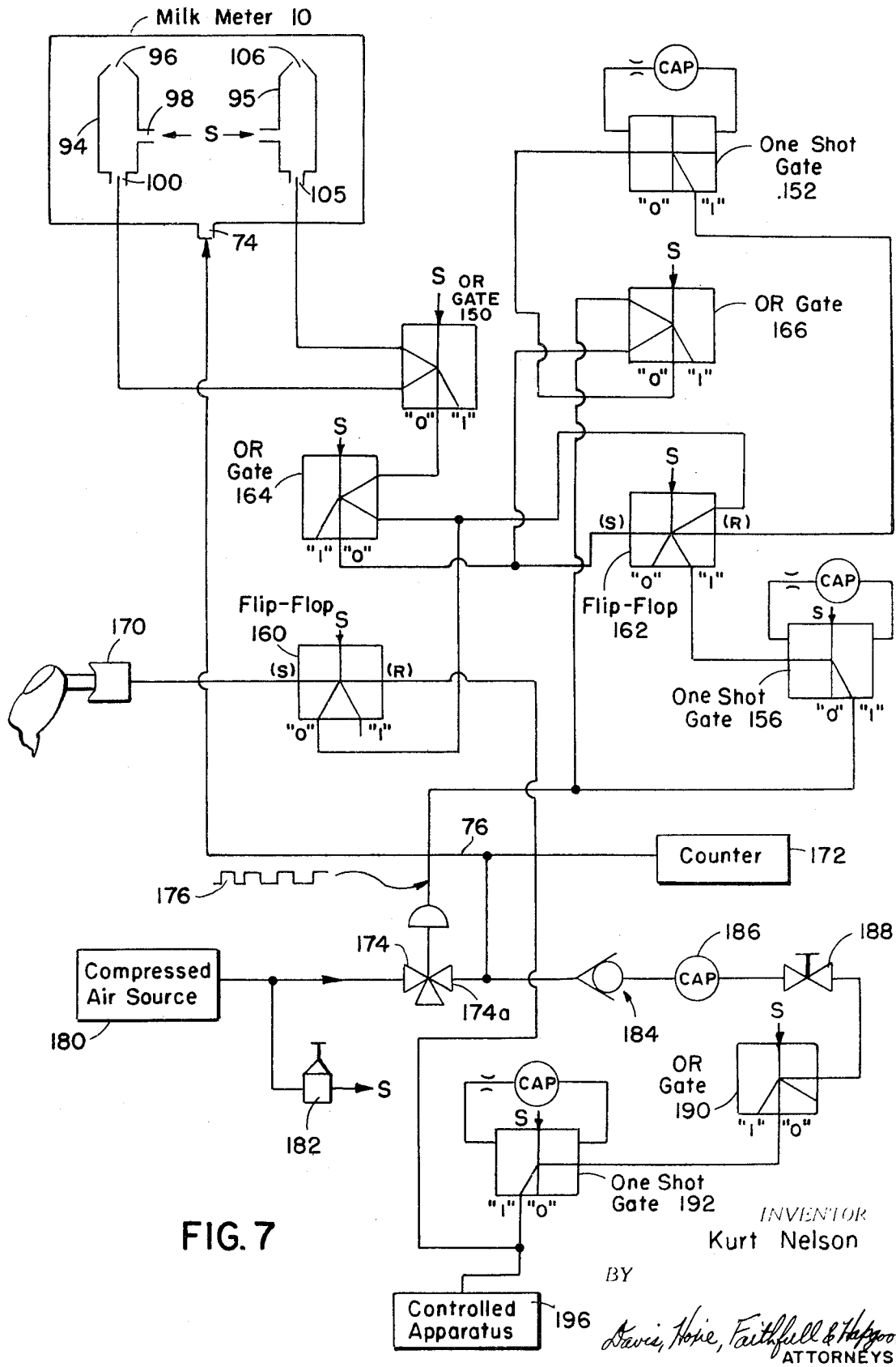

FIGS. 6A–6D schematically depict a plurality of fluidic digital structures employed in the milk-metering system of FIG. 7; and FIG. 7 schematically depicts a fluidic milk-metering system embodying the principles of the present invention.

Figure 1:
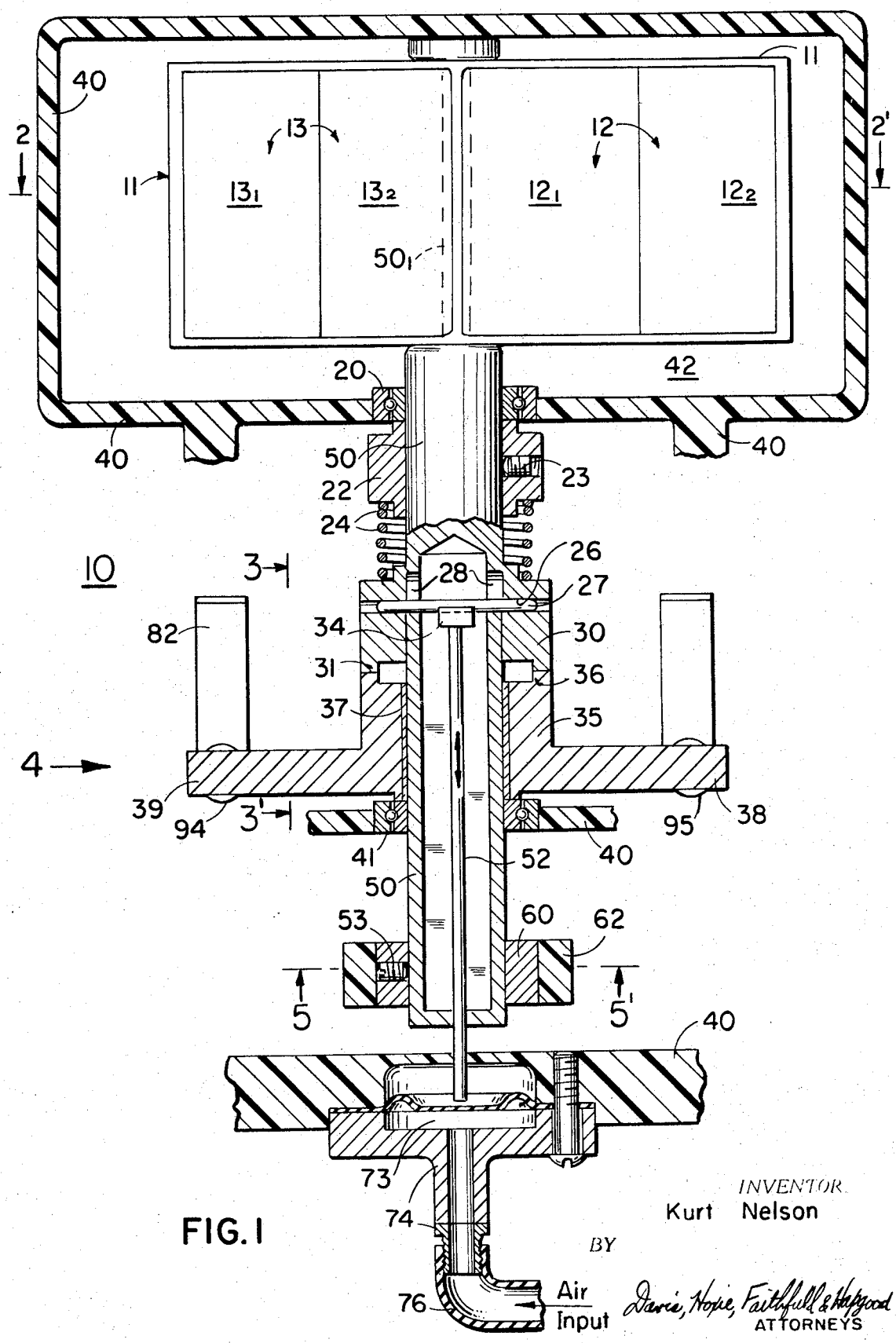

Referring now to FIG. 1, there is shown a milk meter 10 which includes an outer housing 40. A milk-receiving tilt table tray 11 (FIGS. 1 and 2), comprising contiguous milk-receiving chambers 12 and 13 respectively including bottom wall members $12_1$ and $12_2$ and $13_1$ and $13_2$, is mounted on a narrowed section $50_1$ of a central shaft 50. The tray 11 is disposed within a compartment 42 formed by the housing 40, the compartment 42 including a milk inlet port 43 above the tray 11 and a milk outlet port 44 at the bottom of the compartment. The shaft 50, principally of cylindrical cross section except for its end portions, passes through the rear of the compartment 42, and is mounted for rotation by an antifriction bearing 20 secured in the housing wall.

During a milk-metering operation, the tilt table tray 11 continuously reciprocates between two fixed end positions (determined by structure described below), the tray switching stable states each time a predetermined quantity of milk (measured by weight) has been collected. For example, with the tray residing in the "right," or clockwise position shown in FIG. 2, milk flows into the compartment 42 via the inlet port 43 and is diverted by the wall $13_2$ into the chamber 13. When the requisite amount of milk has been accumulated in the chamber 13, the shaft 50 is mechanically disengaged (i.e., made free to rotate) by a clutch assembly 30-35, and the counterclockwise weight moment of the collected milk about the shaft axis causes the table 11 and the shaft 50 to rotate in a counterclockwise direction to an alternate stable position.

Figure 2:
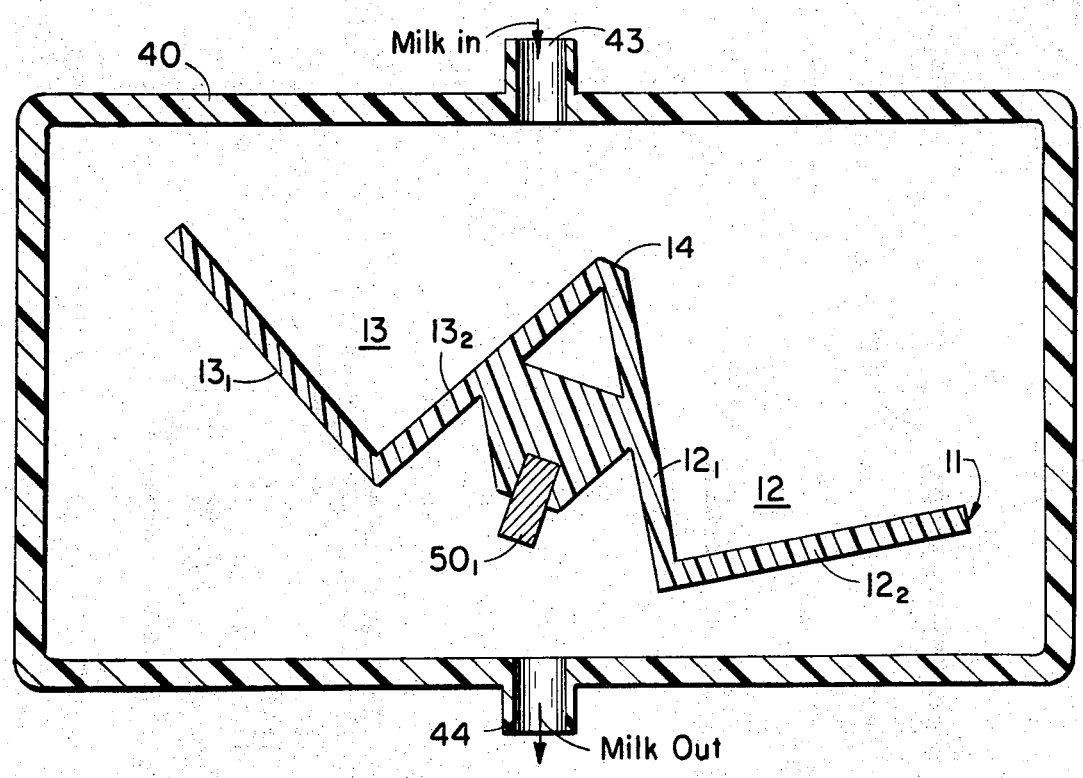
FIG. 2 is a cross-sectional view of the milk meter apparatus of FIG. 1, taken at section 2—2 feet depicting a tilt table arrangement and a milk-receiving compartment.

The second, or "left" (counterclockwise) stable position (not shown in the drawing) comprises the table 11 and shaft portion $50_1$ being canted upwards to the left in the orientation of FIG. 2, the right and left positions being mirror images of each other about a vertical plane through the center of the shaft $50_1$. After this counterclockwise rotation, the previously accumulated milk spills out of the chamber 13 and flows for end collection into a central reservoir or the like via the compartment 42 and the outlet port 44.

With the apparatus in the "left" position, the wall 12₁ lies beneath the milk input port 43 and hence the incoming milk is diverted to, and collected by the tilt table chamber 12. Again after sufficient milk is collected, the shaft 50 is freed by disengaging the clutch members 30 and 35, and the clockwise weight moment of the milk returns the tray 11 and shaft 50 to the "right" position shown in the drawing via a clockwise rotation.

As described hereinbelow, fluidic sensors 94 and 95 are employed to supply a digital output signal as an integral part of each rotation of the tilt table. These pulses, each indicative of a predetermined quantity of milk, are counted to supply a running real time quantized total of the milk given by the animal. Also, each pulse is supplied to OR-type (anticoincidence or disjunctive) logic structure, the output of which frees the shaft 50 by disengaging the two clutch members 30 and 35 to enable the requisite rotation between its two end states. Further, digital processing apparatus may be employed to supply an output "end of milking" control signal when the interval between sensor output signals exceeds a maximum period, this control signal thereby being generated when the cow's milk supply is effectively exhausted.

A spacer bushing 22 is secured to the shaft 50 as by a setscrew 23 to position the tilt table 11 within the compartment 42. A clutch, comprising a driving member 30 and a driven member 35 is concentrically disposed about the shaft 50. The driven clutch member 30 is affixed to the shaft 50 as by a pin 26 within a hole 27, and is thus constrained to rotate with the shaft. The shaft 50 includes a slot 28 therein such that the driven clutch member 30 and the pin 27 may slide axially along the shaft through the length of the slot. A spring 24 is employed to bias the driving clutch member 30 towards the rear of the slot, i.e., in a direction away from the tilt table 11.

The driven clutch member 35 is mounted to freely rotate about the cylindrical shaft 50, as via a sleeve bearing or bushing 37. The driven member 35 includes extended arm portions 38 and 39 which are selectively operable to generate digital output signals in a manner described below when the member 35 rotates slightly.

Figure 3A:
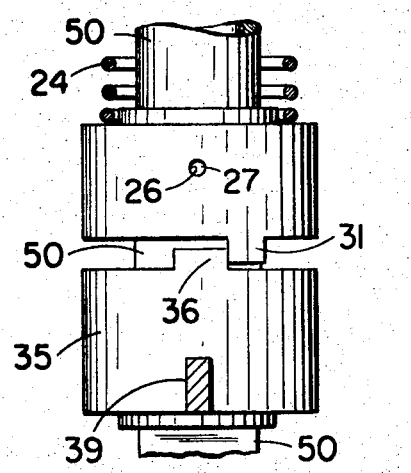
FIGS. 3A and 3B are cross-sectional views taken at section 3—3' in FIG. 1, and depict clutch apparatus of FIG. 1 in its two alternate operating conditions.
Figure 3B:
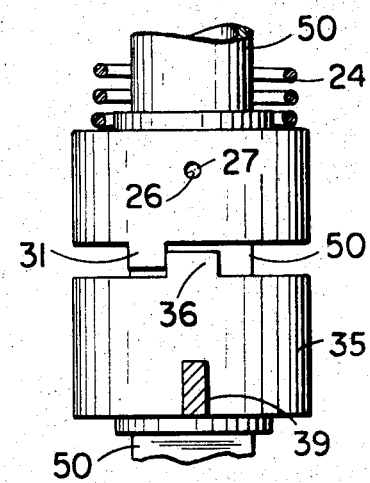

The clutch member 30 (FIGS. 1 and 3A, 3B) includes two lug projections 31 thereon at diametrically opposite points on its rear periphery, and the driven clutch member 35 employs two diametrically spaced lug projections 36 on its front periphery. Two clutch elements 30 and 35 are normally engaged by the spring 24 which biases the driving clutch member 30 to its rearward position such that the clutch projections 31 and 36 are abutting, as shown in FIGS. 3A or 3B. The relationship shown in FIG. 3A, with the lugs 31 offset clockwise from the lugs 36 corresponds to the "right" tilt table 11 position shown in FIG. 2. With this relationship obtaining, milk being collected in the tilt table chamber 13 applies an increasingly large counterclockwise torque to the shaft 50 which is transmitted to the clutch member 30 and lugs 31 via the pin 26. Accordingly, the monotonically increasing torque is applied by the adjacent companion lugs 36 to the driven clutch member 35, and thereby also to the extended arm 39 of the driven clutch member 35.

Correspondingly, with the tilt table 11 disposed in a "left" position, the lugs are disposed as in FIG. 3B with the elements 31 oriented counterclockwise with respect to the lugs 36. Accordingly, when milk is collecting in the chamber 12, a clockwise torque is coupled to the clutch member 35 via the shaft 50, the pin 26, the driven clutch member 30, the lugs 31 and the lugs 36. This impresses a downward, clockwise torque at the extremity of the extended clutch portion 38.

When the critical amount of milk has been collected in one of the chambers 12 or 13, the corresponding downward torque impressed on the associated extended clutch arm 38 or 39 gives rise to a fluidic digital output signal. Examining the structure associated with the element 39 (FIGS. 1 and 4), which is equally descriptive of that associated with the arm 38, it may be seen that the arm 39 includes a mechanical contact member 80 attached thereto. With the tilt table in the "right" orientation of FIG. 2 and no milk yet collected in the chamber 13, a cantilever mechanical member or strip 82, having one end secured within the housing 40, is biased upwards by a compression spring 81 against an adjustable stop 84.

As milk accumulates in the chamber 13, an increasingly large counterclockwise torque is applied to the arm 39 as above described. Accordingly, the arm 39, acting through the contacting element 80, forces the cantilever strip 82 downward against the retarding action of the spring 81, thereby compressing this spring.

Disposed beneath the strip 82 is the fluidic sensor 94 which includes an air-supplying input port 98, an exhaust port 96, and a signal output port 100. The orifice of the exhaust port 96 is made considerably larger than that of the supply port 98. When the exhaust port 96 is unblocked, essentially all of the air supplied to the input port 98 is vented by the exhaust port 96, and essentially no air exits from the signal port 100. This corresponds to one binary condition at the output port 100 which may be deemed a digital "0."

When the critical quantity of milk has been collected in the chamber 13, the downward force impressed on the strip 82 by the arm 39 and contact element 80 is made sufficient to compress the spring 81 such that the sheet 82 covers and blocks the exhaust port 96 of the sensor 94. A screw 90, having one end of the spring 81 connected thereto, is provided to effect and adjust the desired applied strip 82 motion transfer characteristic such that the port 96 is not covered until the desired amount of milk has been collected.

With the exhaust port 96 covered, air supplied at the input port 98 exits from the signal output port 100, thereby changing the digital condition at that point from a binary "0" to a binary "1." Thus, an air flow output from the sensor 94 provides an indication that the predetermined quantity of milk has been accumulated in the compartment 13.

Figure 4:
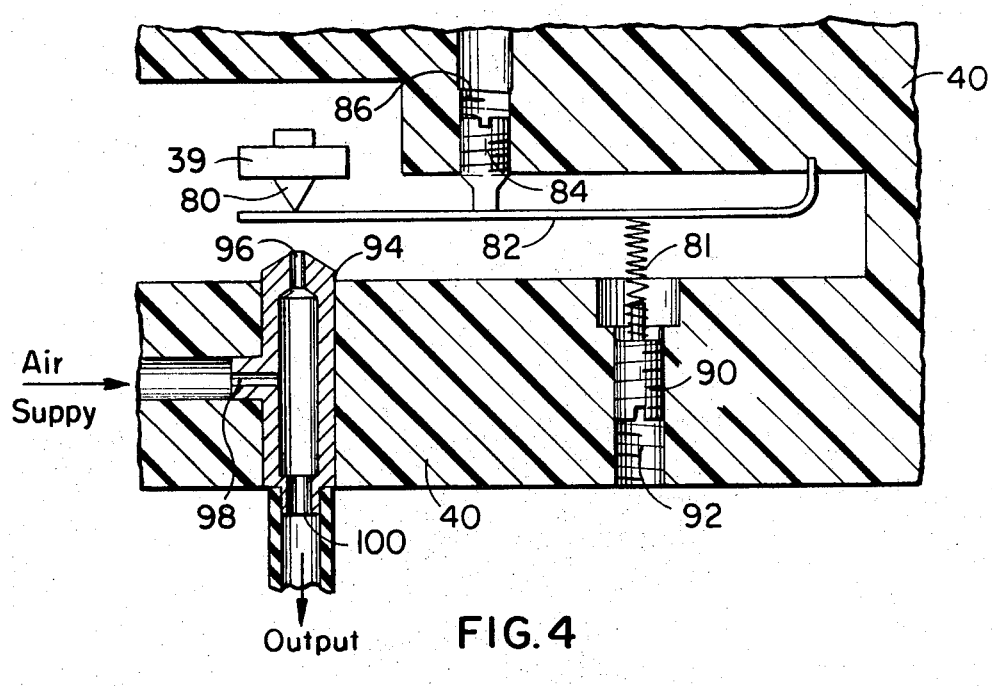
FIG. 4 is a detailed view of a fluidic sensor arrangement shown in FIG. 1.

Correspondingly, a structure similar to that of FIG. 4, and including the sensor 95 (FIG. 7) is associated with the clutch extended arm portion 38, and supplies an output air pulse via a signal port 105 when the driven clutch member 35 is driven clockwise by the critical quantity of milk being contained in the tilt table chamber 12. Thus, it may be seen that the sensors 94 and 95, and more specifically output signal ports 100 and 105 thereof, alternately supply air pulses when the preselected quantity of milk is contained in the tilt table chambers 13 and 12, respectively.

Figure 5:
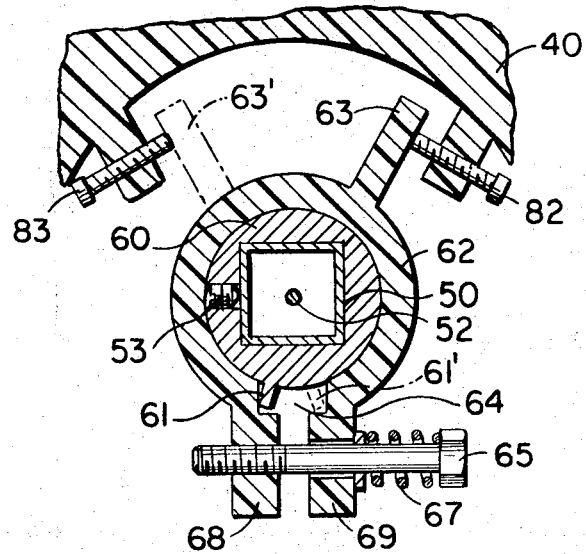
FIG. 5 is a partial cross-sectional view of the milk meter apparatus of FIG. 1, taken at section 5—5', depicting reciprocation limiting structure.

The shaft 50 passes through a bearing 41 in the housing 40 and, beyond this bearing, becomes noncircular in cross section e.g., square in form. Mounted about the square portion of the shaft 50 (FIGS. 1 and 5), is an inner annular member 60, e.g., of aluminum, which is fixed to the shaft as by a setscrew 53. The inner member 60 includes a tab projection 61 thereon. Concentrically disposed around the inner member 60 is an outer annular member 62, e.g., formed of plastic such as Nylon, which includes an extended stop projection 63, and two projections 68 and 69 for securing the members 60 and 62 together. The outer ring 62 is adapted to selectively rotationally slip with respect to the inner ring 60, the ease of slippage being largely determined by the compressive force between the two members. The compression is, in turn, determined by the tightness of a bolt 65 which engages threads in the projection 68, and by a spring 67 disposed between the head of the bolt 65 and the projection 69.

Two adjustable stop bolts 82 and 83 are secured within the housing 40. The two stable conditions for the tilt table 11 are determined by the outer ring projection 63 abutting a corresponding one of the stops 82 or 83. In particular, the tray 11 will be disposed in its "right" position shown in FIG. 2 when the projection 63 engages the right stop 82, and wherein the projection 61 of the inner ring 60 is disposed against the left wall of an aperture 64 within the outer ring 62.

Correspondingly, the tilt table 11 will be disposed in its "left" position when the shaft 50, inner ring 60, and outer ring 62 rotate counterclockwise such that the extended portion 63 assumes the dashed orientation 63' in the drawing against the stop 83, and wherein the projection 61 rotates to the right wall of the aperture 64 to the dashed position 61'.

When the tilt table tray 11, shaft 50, and rings 60 and 62 rotate between the two end positions for the table, the outer ring 62 stops when its projection 63 reaches a stop 82 or 83. However, the shaft 50 and the inner ring 60, and thereby also the tilt table 11, are allowed to rotate ("slip") through a further limited arc within the outer ring 62 until the projection 61 switches between side walls of the aperture 64. This slippage (gradual angular velocity damping) is provided to allow the tilt table 11 to decelerate gradually. Absent this provision, the composite apparatus may tend to bounce when the ring projection 63 sharply engages a stop 82 or 83, causing spurious movements of the extended arm portions 38 and 39 of the clutch member 35. This, in turn, might otherwise give rise to spurious output signals from the sensors 94 and 95. Alternatively, any such transients may be rejected by low pass filtering (i.e., high inertia response logic).

Finally, a rod 52 (FIG. 1) passes within the shaft 50 and includes an expanded end portion 34 which contacts the pin 26. The rod 52 extends through the rear housing wall 40, and is disposed near a diaphragm 72 having its periphery secured to the housing 40. Finally, an air input port 74 is selectively supplied with air by way of a conduit 76, the area behind the diaphragm being generally identified as a cavity 73.

When a critical quantity of milk is contained in either of the tilt table chambers 12 or 13, as manifested by an output air flow at the output port 100 or 105 of one of the sensors 94 or 95, air is supplied to the conduit 76 by fluidic anticoincidence (OR) logic as described below. The air pressure in the cavity 73 forces the diaphragm forward in FIG. 1, hence also forcing expanded head 54 of the rod 52 forward. This, in turn, pushes the pin 26 forward through the slot 28 toward the tilt table 11 hence also forcing the driven clutch member 30 forward while compressing the spring 24. As the driven clutch member moves forward in FIG. 1, the lug projections 31 and 36 on the clutch members 30 and 35 no longer abut, and are thus disengaged. Accordingly, the clutch member 30, the shaft 50, and the tilt table 11 are free to rotate within the bearings 20 and 41. The tilt table, shaft and clutch therefore rotate in a direction, determined by the particular chamber 12 or 13 which contains milk, such that the previously filled chamber empties, and incoming milk is diverted to the alternate chamber. The next position for the table is, as discussed above, determined by the stops 82 and 83 and the concentric stop members 60 and 62. The actuating weight moment of the accumulating milk assures complete rotation of the tilt table 11 such that indeterminate, equipoise conditions for the tilt table between its two end positions cannot occur.

The air pulse supplied to conduit 76 is permitted to last only a short time, and the pressure is quickly removed after the tilt table 11 rotates. Accordingly, the diaphragm 72 returns to its passive state, and the compressed spring 24 forces the driven clutch member 30 rearward such that the pins 31 and 36 are again engaged. However, since the shaft 50 and the clutch member 30 have rotated, the relative orientation of the clutch lugs 31 and 36 is reversed from the condition previously obtaining. For example, the orientation of FIG. 3A corresponds to the right tilt table position shown in FIG. 2. After the chamber 13 fills, and the apparatus rotates counterclockwise, the alternate position of FIG. 3B is developed. Similarly, after the next succeeding clockwise rotation, that of FIG. 3A, is again instituted.

Thus, in summary, the tilt table starts from a canted initial position, e.g., the right position of FIG. 2. The orientation of the tilt table 11, shaft 50, and driving clutch member 30 is determined by the rear projection 63 of member 62 abutting the stop 82, and the inner projection 61 of member 60 abutting the left wall of the aperture 64. Incoming milk is diverted by the wall $13_2$ to the chamber 13, thereby applying an increasingly large counterclockwise torque to the shaft 50, pin 26, driving member 30, lugs 31, lugs 36, and driven clutch member 35 to the extended arm 39. This torque is resisted by the spring 81. As the torque increases, a correspondingly increasing force is applied to the strip 82 which moves downward and compresses the spring 81. When the critical quantity of milk has been collected, the strip 82 blocks the exhaust orifice 96 of the sensor 94 giving rise to an output airflow from sensor port 100.

OR logic, described below, responds to the output from the sensor 94 by applying air pressure to the cavity 73, thereby extending the diaphragm 72. The extended diaphragm 72 forces the rod 52 forward, thereby also forcing the pin 26 and the driving clutch member 30 forward to disengage the clutch members, i.e., to separate the lugs 31 and 36.

With the clutch disengaged, the tilt table 11 and shaft 50 are free to rotate, and do rotate counterclockwise under action of the milk moment. The tilt table 11 and shaft 50 rotate counterclockwise until the lug 63 abuts the left stop 83, and rotate a bit more as the inner ring 60 slips within the outer ring 62 until the lug 61 engages the right wall of the aperture 64.

The tilt table 11 thus attains its left (counterclockwise) stable end position, and incoming milk is now diverted by the wall $12_1$ to the chamber 12 where it is collected until the critical quantity of milk has been amassed. Thereupon, the torque applied to the extended portion 38 of the clutch member 35 is sufficient to activate the sensor 95 to again disengage the clutch members, and cause the chamber 12 to empty into the compartment 42 for collection. This reciprocating operation repetitively continues as long as milk is supplied to the milk input port 43.

Thus, the milk meter of FIGS. 1 through 5 has been shown by the above to supply a sequence of serial output signals each indicative of a fixed quantity of milk having been supplied by a cow, and delivered to milk input port 43 of the compartment 42. This milk meter has general application wherever milk meters are employed (or for other flow-metering applications), and may also be employed with the specific, illustrative fluidic apparatus described hereinbelow.

Referring now to FIG. 7, there is shown milking apparatus employing fluidic logic control in conjunction with the milk meter 10 of FIGS. 1-5. The individual fluidic structures shown therein are supplied with an input air pressure ("power"), e.g., 3 p.s.i., developed by a compressed air source 180 acting in cooperation with a pressure regulating and reducing valve 182 of any conventional type. Throughout FIG. 7, each line from the source and regulator 180-182 to any gate, and the lines between any two gates, represent closed conduits such as plastic tubing for the passage of compressed air.

The particular gate structures included in the milking arrangement of FIG. 7 are depicted in FIGS. 6A through 6D. FIG. 6A illustrates an OR logic gate 110 having a "power" input port 111 connected to the 3 p.s.i. compressed air source 189-182. The gate 110 includes two air input ports 112 and 114 which, for purposes of illustration, are respectively assigned two input digital variables A and B, with the requisite two digital states being identified by the presence or absence of a compressed air input. Finally, the gate 110 includes "1" and "0" output ports 115 and 116 which respectively correspond to digital variables C and D.

The Boolean combinatorial expressions characterizing the output ports 115 and 116 as a function of the input variables are given in FIG. 6A. In particular, a compressed airflow will appear at the "1" output port 115 (variable C) if air was present in the input port 112 (an enabled A signal) or if air was present at the input port 114 (an enabled B signal), or both. The output port 115 thus exhibits the disjointive, or OR logic function of the two input variables A and B. Correspondingly, the "0" output port 116 has an airflow therepast if neither the A nor B signals is present (the NOR Boolean function).

It is observed that the input and exit airflow signal streams are characterized by a pressure somewhat reduced from that supplied by the compressed air source 180-182 to the port 111 of the gate 110, this being the case also for the other fluidic structures described hereinafter. Also, for purposes of clarity, the 3 p.s.i. power input for each fluidic structure is simply indicated by the letter "S" throughout the drawing, it being understood that these power input ports are directly connected by air passing conduits to the compressed air source 180-182.

An AND logic gate 120 is illustrated in FIG. 6B and includes a power input port 121 supplied by the compressed air source 180-182. A "1" output terminal 126 (a variable G) exhibits an output air flow if an input port 122 (E) and an input port 124 (F) are both coincidentally energized, and not otherwise (the AND Boolean function). An "0" output port 125 (a variable H) of the AND-gate 120 is activated if either or both of the input ports 122 and 124 is not supplied with an input air stream (the NAND function).

A bistable flip-flop 130 is depicted in FIG. 6C and includes "0" and "1" output ports 136 and 137, and reset (R) and set (S) input ports 132 and 134. Compressed air from a power input port 131 will exit from the "0" output 136 or from the "1" output 37 depending upon whether the reset input port 132 or the set input port 134, respectively, was last supplied with an input signal. Moreover, such exit flow will persist until the other input port is pulsed.

Finally, the arrangement of FIG. 7 includes a one-shot gate 140 shown in FIG. 6D. The gate 140 includes an input port 141 driven by the power source 180-182, and a "0" output 145 which quiescently passes the exit air stream. When a toggle input port 143 is pulsed with an air stream, the exit airflow switches to a "1" output port 144 for a short time interval, and then returns to the "0" output 145. The duration of the airflow at the "1" port 144 is determined by the size of a fluidic timing capacitor 142 which comprises a hollow cavity.

Specific embodiments for the above-described fluidic structures are well known in the art. For example, such structures may be purchased from the Corning Glass Works, Corning, New York.

Returning now to the milk metering arrangement of FIG. 7, there is employed the milk meter 10 illustrated in detail in FIGS. 1-5 and described above. For present purposes, i.e., with regard principally to the fluidic control portion of the composite structure, there is shown the two sensors 94 and 95 for signaling milk accumulation in the tray chambers 13 and 12, and the input port 74 for receiving air pulses which selectively free the tilt table 11 for rotation.

Before milking is initiated, a flip-flop 160 is initially in a reset state with air exiting from the "0" exit port thereof. The energized "0" output of the flip-flop 160 enables one input of an OR logic gate 164 hence forcing air to leave the gate 164 via the "1" output terminal. Thus, air is not supplied from the "0" output of the OR-gate 164 to the set input of a flip-flop 162 prior to milking. Moreover, the "0" output of the flip-flop 160 energizes one of two reset inputs of the flip-flop 162 thereby maintaining this flip-flop in a reset condition with no air leaving the "1" output terminal thereof.

When milking, and more specifically milk metering is to begin, an operator actuates a pushbutton 170 thereby supplying an air input pulse to the set terminal of the flip-flop 160. The flip-flop 160 is thus set, and the "0" output thereof is passive. Accordingly, the OR-gate 164 is rendered responsive to the output of an OR-gate 150; and the flip-flop 162 becomes responsive to the output from the OR-gate 164.

With milking in progress, air pulses are alternately supplied via the sensor output ports 100 and 105 to the two inputs of the OR-gate 150 each time the predetermined quantity of milk has been collected in the tray chambers 13 and 12. Each such pulse, acting at one of the two inputs of the OR-gate 150, diverts air from the "0" to the "1" output of the gate 150, hence momentarily removing air from the input to the OR-gate 164. With no active input, an airflow pulse is generated at the "0" output of the gate 164 and operates to set the flip-flop 162.

The pulse at the "0" output port of the OR-gate 164 is also supplied to a one-shot gate 152 by way of an OR-gate 166. The one-shot gate 152 generates a delayed pulse corresponding to the applied input energization at its "1" output which resets the flip-flop 162. Thus, a pulse (of duration corresponding to the delay effected by the gate 152) is produced at the "1" output of the flip-flop 162 each time an output signal is produced by the sensor 94 or the sensor 95 (the cascaded NOR functions effected at the serial "0" outputs of gates 150 and 164 thus producing a logical OR function operating on the outputs of sensors 94 and 95).

Each air pulse at the "1" output of the flip-flop 162 is coupled to the input of a one-shot gate 156. Accordingly, the one-shot gate 156 produces an air pulse at its "1" output which is supplied to a pressure actuated valve 174. Since the one-shot gate 156 is actuated for each of the recurring output signals from the sensors 194 and 195, the pressure from the actuated valve 174 comprises a train of pulses (usually nonperiodic) as indicated at 176 in the drawing. Responsive to each such pulse, the valve 174 opens and connects the valve output 174a to the compressed air source 180. The valve output 174a is thus characterized by a series of high-pressure air bursts. Each output pulse from the one-shot gate 156 is also operable to reset the flip-flop 162 via the gates 166 and 152 if the flip-flop was not already reset for any reason.

The pulsed output of the valve 174 gives rise to three system functions. First it is recalled that a pulse is developed at the output of the valve 174 responsive to each pulse output from either sensor 94 or 95, and that each of these pulses signals that a fixed weight of milk has been collected in a tilt table compartment 12 or 13. Each output pulse at the valve output 174a thus corresponds to a specific quantity of milk. Accordingly, these pulses are counted in any conventional counter 172 to yield a running quantized indication of the milk taken from a cow during the particular milking period. The counter 172 may comprise a directly actuated pneumatic device, or a mechanical or electrical counter actuated via a suitable interface which converts each air pulse to a mechanical motion or an electrical signal as a contact actuation.

The output from a sensor 94 or 95, and thereby also that of the valve 174 is produced when the critical amount of milk has been collected, and when the tilt table is in a position to freely rotate about the shaft 50 for milk collection by disengaging the clutch members 130 and 135. Accordingly, the pulsed output from the valve 174 is coupled by the conduit 76 to the input 74 of the milk meter 10 to extend the diaphragm 72, thereby forcing the actuator rod 52 forward toward the tilt table 11. As considered in detail above, this disengages the clutch members 30 and 35 and permits appropriate rotation of the tilt table 11. When the pressure pulse terminates, the compressed spring 24 again engages the clutch elements 30-35 in a relative position such that milk collection in the alternate tilt table chamber is initiated.

The output pulses produced by the valve 174 also pass via a check valve 184 to an air storing capacitor 186. The storage capacitor 186 is coupled by a valve 188 with a variable orifice to an input of an OR logic gate 190. The capacitor 186 discharges air into an input of the OR-gate 190 through the adjustable orifice 188 between consecutive pulses from the valve 174. As long as air is so discharging, the OR-gate 190 receives an input energization and emits air from its "1" output rather than from its "0" output.

The rate at which the capacitor 190 discharges is adjusted by varying the orifice of the valve 188 such that the air storing capacitor 186 will not fully empty between consecutive pulses supplied by the valve 174 and the one-shot gate 156, provided that such pulses occur within a maximum acceptable time spacing. This, in turn, requires that milk is derived from the cow at a rate which will cause the milk meter tilt table 11 to reciprocate with a sufficient frequency to keep capacitor 186 from fully discharging.

Milk is initially supplied relatively rapidly from a cow, and hence the time interval between consecutive pulses produced at the outputs 100 and 105 of the sensors 94 and 95 is relatively short. As milking progresses, the cow's milk supply diminishes and the time interval increases monotonically.

Eventually, when the cow's milk supply is exhausted, at least to the extent that it is not economically desirable to continue milking, the capacitor 186 will be fully discharged before its air supply is replenished by the valve 174 responding to a sensor pulse. Accordingly, there is no active input to the OR-gate 190, and the "0" output terminal of the gate 190 supplies an exit airflow to the input of a one-shot gate 192. The one-shot gate 192 thus produces an output pulse at the "1" output terminal thereof. This pulse in essence signals that milking is completed.

The "end of milking" pulse produced by the gate 192 is supplied to apparatus generally indicated in the drawing as comprising output utilization controlled apparatus 196. The controlled apparatus 196 may simply comprise a pneumatic switch to illuminate a light which visually signals the end of milking to an operator. Further, the apparatus 196 may include structure for producing more complex functions responsive to the incident pulse such as automatically opening a milking stall gate, removing teat cups and a milker arm, and the like as illustrated for example, in my aforementioned copending application.

The pulse at the "1" output terminal of the one-shot gate 192 also resets the flip-flop 160 which was initially set by the start button 170. The reenergized "0" output of the flip-flop 160 again blocks the "0" output of OR-gate 164, and maintains the flip-flop 162 in a reset state to inhibit any further system actuation until the start button 170 is again pressed. The reset flip-flop 162 and the blocked OR-gate 164 prevent any spurious pulses which may be developed by the sensors 94 and 95 from inadvertently triggering the gate 156, and thereby prevent any such pulse from signaling the counter or the controlled apparatus 196.

Thus, the automated milking apparatus of FIG. 7 has been shown by the above to generate an air pulse at the output of the valve 174 each time the predetermined amount of milk has been collected in a tilt table chamber 12 or 13 via disjointive, or anticoincidence logic. The output pulses of the valve 174 are counted in a unit 172 to provide a running total of the milk supplied by a cow. The output pulses are also supplied to the port 74 of the milk meter 10 to free the tilt table 11 for rotation for collection of the previously accumulated milk, and to initiate milk collection in the alternate chamber 12 or 13. The counter 172 may provide a visual indication of the milk taken from a cow; a physical record of the milk; or both.

Further, a capacitor 186 is charged during each tilt table reciprocation, and is continuously discharged through a valve 188 with an adjusted, limited orifice and through an OR-gate 190. When the interval between successive pulses becomes unduly long, indicative of the milk supply being effectively exhausted, the capacitor 186 fully empties and the one-shot gate 192 is triggered by the OR-gate 190. The one-shot gate 192 develops a pulse at the "1" output port thereof to signal that milking has been completed. The output signal is employed to reset the flip-flops 166 and 160 and to block the OR-gate 164 such that no further system functioning occurs until the start button 170 is again actuated to begin a new milking operation.

It is to be understood that the above-described arrangement is only illustrative of the principles of the present invention. Numerous modifications and adaptations thereof may be made by those skilled in the art without departing from the spirit and scope thereof. For example, the fluidic digital logic apparatus, storage elements, and the like may be replaced by their equivalent electrical counterparts. Care must be taken, however, to protect all metallic electrical conductors and connectors from the strong ammonia vapors found in dairy barns, a problem not associated with the above-described fluidic structures.

What is claimed is:

1. In combination in milk meter apparatus, a tilt table including two milk-receiving chambers, said table being rotatable between two positions to discharge milk from said chambers alternately while positioning a previously discharged chamber to receive milk, the milk received in each chamber having a tendency to rotate the table from one position to the other, clutch means including first and second members, said first clutch member being connected for rotation with said tilt table, said second clutch member not being constrained to rotate with said tilt table, means for engaging said first and second clutch members, means for limiting said rotation under said tendency including first and second sensor means coupled to said second clutch member and adapted to supply output signals, respectively, when a force exceeding a predetermined threshold level is applied thereto in either of two directions of rotation, said force being applied to said second clutch member via said tilt table and said first clutch member, and means for selectively disengaging said first and second clutch members responsive to an output signal from either of said sensor means, to permit rotation of the table under said tendency for discharge of the milk.

2. A combination as in claim 1 wherein said tilt table comprises first and second contiguous chambers, and means for deflecting milk into one of said chambers.

3. A combination as in claim 2 further comprising a shaft connected to said tilt table, means for securing said first clutch member for rotation with said shaft, means for mounting said second clutch member for rotation with respect to said shaft, said clutch member disengaging means comprising means for sliding said first clutch member axially along said shaft with respect to said second clutch member.

4. A combination as in claim 3 wherein said first and second clutch members each include at least one lug, said lugs on said first and second clutch elements being selectively engageable.

5. A combination as in claim 1 wherein said first and second sensor means each include a fluidic sensor having air input, vent and signal output ports, and means for selectively blocking said vent ports of said sensors, said second clutch member including means for selectively actuating said vent-blocking means.

6. A combination as in claim 5 further comprising means for biasing said vent port blocking means.

7. A combination as in claim 1 further comprising a shaft connected to said tilt table, a slot in said shaft, a pin through said slot and engaging said first clutch member, said pin being adapted to selectively slide through said slot and said first clutch member being constrained to slide with said pin, and spring means for urging said clutch members into an engaged position.

8. A combination as in claim 7 further comprising actuator arm means for selectively moving said pin through said slot and compressing said spring means.

9. A combination as in claim 8 further comprising diaphragm means for selectively moving said actuator arm means.

10. A combination as in claim 3 further comprising stop means secured to said shaft.

11. A combination as in claim 10 wherein said stop means comprises an inner annular ring secured to said shaft and an outer member disposed about said ring, means on said outer member for selectively stopping rotation of said outer member, and means for permitting said inner annular ring and said shaft to rotate through a predetermined arc within and with respect to said outer member.

12. A combination as in claim 11 further comprising means for adjusting the sliding tension between said inner ring and said outer member.

13. A combination as in claim 1 further comprising a counter, and means for energizing said counter responsive to an output signal from either of said sensor means.

14. A combination as in claim 1 further comprising disjointive logic means for producing an output signal responsive to an output signal produced by either said first or said second sensor means.

15. A combination as in claim 14 further comprising a capacitor, means for discharging said capacitor at a predetermined rate, means for charging said capacitor responsive to a pulse produced by said disjointive logic means, and means responsive to said capacitor becoming fully discharged for producing an output signal.

16. A combination as in claim 15 wherein said output signal producing means comprises a one-shot gate, and means for energizing said one-shot gate when said capacitor is fully discharged.

17. A combination as in claim 14 further comprising a counter connected to said logic means.

18. A combination as in claim 14 further comprising means for actuating said clutch-disengaging means responsive to each pulse produced by said logic means.

19. In combination in fluid-metering apparatus, a tilt table including two fluid-receiving chambers, means for mounting said table for reciprocating rotation about an axis between two stable end positions to discharge milk from said chambers alternately while positioning a previously discharged chamber to receive milk, said tilt table being operable to exert an increasing torque in one direction about said axis as milk is received in one of said chambers and to exert an increasing torque in the opposite direction about said axis as milk is received in the other of said chambers, sensing means for sensing said increasing torque in each of said directions and for generating an output signal when said torque exceeds a predetermined threshold level, means for resisting rotation of said tilt table away from its stable end positions under the action of said torque, and means responsive to each output signal from said sensing means for disabling said rotation-resisting means and for permitting said tilt table to rotate about said axis to its alternate stable end position.

20. A combination as in claim 19 wherein said sensing means includes first and second sensors each responsive to a torque in a different direction for selectively producing an output signal when said associated torque exceeds a predetermined threshold level.

21. A combination as in claim 20 further comprising disjointive logic means for producing an output signal responsive to an output signal being produced by either of said sensors.

22. A combination as in claim 21, wherein said rotation-resisting means includes means responsive to an output from said disjointive logic means for permitting tilt table rotation.

23. A combination as in claim 22 further comprising a counter connected to said logic means.

* * * * *